(12) United States Patent
Landa et al.

(10) Patent No.: US 6,541,083 B1
(45) Date of Patent: Apr. 1, 2003

(54) VACUUM IG UNIT WITH ALKALI SILICATE EDGE SEAL AND/OR SPACERS

(75) Inventors: Ksenia Landa, Jeannette, PA (US); Leonid Landa, Jeannette, PA (US); Steven L. Aggas, Pinckney, MI (US); Yei-Ping H. Wang, Troy, MI (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 09/480,895

(22) Filed: Jan. 11, 2000

(51) Int. Cl.$^7$ .............................. E06B 3/24; E04C 2/54
(52) U.S. Cl. ......................................... 428/34; 428/192
(58) Field of Search .............................. 428/34, 68, 70, 428/76, 120, 786.1, 786.11, 786.13; 156/1.7, 109

(56) References Cited

U.S. PATENT DOCUMENTS

| | | |
|---|---|---|
| 49,167 A | 1/1865 | Stetson |
| 1,370,974 A | 3/1921 | Kirlin |
| 1,448,351 A | 3/1923 | Kirlin |
| 1,774,860 A | 9/1930 | Wendler et al. |
| 2,011,557 A | 8/1935 | Anderegg |
| 2,625,717 A * | 1/1953 | Wampler et al. ............... 428/34 |
| 2,962,409 A | 11/1960 | Ludlow et al. |
| 3,441,924 A | 4/1969 | Peek et al. |
| 3,742,600 A | 7/1973 | Lowell |
| 3,902,883 A | 9/1975 | Bayer |
| 3,912,365 A | 10/1975 | Lowell |
| 3,936,553 A | 2/1976 | Rowe |
| 3,974,316 A * | 8/1976 | Jacquemin et al. .......... 428/215 |
| 4,064,300 A | 12/1977 | Bhangu |
| 4,130,408 A | 12/1978 | Crossland et al. |
| 4,130,452 A | 12/1978 | Indri |
| 4,173,668 A * | 11/1979 | Hentzelt et al. ............... 428/34 |
| 4,305,982 A | 12/1981 | Hirsch |
| 4,334,941 A * | 6/1982 | Neely ............................ 428/34 |
| 4,433,016 A | 2/1984 | Neely, Jr. et al. |
| 4,485,601 A * | 12/1984 | De Boel ....................... 428/232 |
| 4,487,482 A | 12/1984 | Kobayashi et al. |
| 4,514,450 A | 4/1985 | Nowobilski et al. |

(List continued on next page.)

FOREIGN PATENT DOCUMENTS

| | | |
|---|---|---|
| EP | 0 831 973 A1 | 3/1998 |
| FR | 2 483 564 | 4/1981 |
| FR | 2 482 161 | 11/1981 |
| WO | WO 99/47466 | 9/1999 |

OTHER PUBLICATIONS

International Search Report, Mar. 27, 2001.
Simko et al, "Temperatur–Induced Stresses in Vacuum Glazing: Modelling and Experimental Validation", Solar Energy, vol. 63, No. 1, pp. 1–21, 1998.
Griffiths et al, "Fabrication of Evacuated Glazing at Low Temperature", Solar Energy, vol. 63, No. 4, pp. 243–249 (1998).
Lenzen et al, "Thermal Outgassing of Vacuum Glazing".
Collins et al, "Current Status of the Science and Technology of Vacuum Glazing", Solar Energy, vol. 62, No. 3, pp. 189–213 (1998).
"Measuring Units", p. 1–38.
"Fluid Properties", p. 3–35.
"Liquid Lubricants", p. 6–197.

Primary Examiner—Donald J. Loney
(74) Attorney, Agent, or Firm—Nixon & Vanderhye P.C.

(57) ABSTRACT

A vacuum insulating glass (IG) unit. In certain embodiments, the peripheral or edge seal may include an alkali silicate, thereby enabling low cure temperatures to be used in forming the seal. This allows tempered glass substrates to retain a significant portion of their original temper strength, even after the seal is formed. In certain alternative embodiments, at least one spacer/pillar of the vacuum IG unit may be made of or include an alkali silicate.

7 Claims, 3 Drawing Sheets

U.S. PATENT DOCUMENTS

| | | |
|---|---|---|
| 4,683,154 A | 7/1987 | Benson et al. |
| 4,786,344 A | 11/1988 | Beuther |
| 4,824,215 A | 4/1989 | Joseph et al. |
| 4,874,461 A | 10/1989 | Sato et al. |
| 4,924,243 A | 5/1990 | Sato et al. |
| 4,956,217 A | 9/1990 | Heitkamp |
| 4,983,429 A | 1/1991 | Takayanagi et al. |
| 5,100,581 A | 3/1992 | Watanabe et al. |
| 5,124,185 A | 6/1992 | Kerr et al. |
| 5,157,893 A | 10/1992 | Benson et al. |
| 5,175,975 A | 1/1993 | Benson et al. |
| 5,234,738 A | 8/1993 | Wolf |
| 5,244,709 A * | 9/1993 | Vanderstukken ............. 428/99 |
| 5,247,764 A | 9/1993 | Jeshurun et al. |
| 5,315,797 A | 5/1994 | Glover et al. |
| 5,399,406 A | 3/1995 | Matsuo et al. |
| 5,489,321 A | 2/1996 | Tracy et al. |
| 5,499,128 A | 3/1996 | Hasegawa et al. |
| 5,596,981 A | 1/1997 | Soucy |
| 5,657,607 A | 8/1997 | Collins et al. |
| 5,664,395 A | 9/1997 | Collins et al. |
| 5,739,882 A | 4/1998 | Shimizu et al. |
| 5,824,147 A | 10/1998 | Drechsler et al. |
| 5,855,638 A | 1/1999 | Demars |
| 5,891,536 A | 4/1999 | Collins et al. |
| 5,902,652 A | 5/1999 | Collins et al. |
| 6,049,370 A | 4/2000 | Smith, Jr. et al. |

* cited by examiner

VACUUM IG UNIT WITH ALKALI SILICATE EDGE SEAL AND/OR SPACERS

RELATED APPLICATIONS

Commonly owned U.S. Ser. No. 09/348,281 entitled "PERIPHERAL SEAL FOR VACUUM IG WINDOW UNIT" filed Jul. 7, 1999, now U.S. Pat. No. 6,365,242, Ser. No. 09/303,550 entitled "VACUUM IG PILLAR WITH DLC COATING" filed May 3, 1999, now U.S. Pat. No. 6,326,067 Ser. No. 09/404,659 filed Sep. 24, 1999 entitled "VACUUM IG WINDOW UNIT WITH PERIPHERAL SEAL AT LEAST PARTIALLY DIFFUSED AT TEMPER"; and now U.S. Pat. No. 6,336,984 Ser. No. 09/40,697 filed Nov. 16, 1999 entitled "VACUUM IG WINDOW UNIT WITH FIBER SPACERS", now U.S. Pat. No. 6,436,492 are all hereby incorporated herein by reference.

This invention relates to a vacuum insulating glass (IG) unit. More particularly, this invention relates to a vacuum IG unit having a peripheral or edge seal including an alkali silicate. In certain other embodiments, pillars/spacers of the unit may include an alkali silicate.

BACKGROUND OF THE INVENTION

Vacuum IG units are known in the art. For example, see U.S. Pat. Nos. 5,664,395, 5,657,607, 5,891,536 and 5,902,652, the disclosures of which are all hereby incorporated herein by reference.

Prior art FIGS. 1–2 illustrate a conventional vacuum IG unit. IG unit 1 includes two spaced apart sheets of glass 2 and 3 which enclose an evacuated or low pressure space 16 therebetween. Glass sheets 2 and 3 are interconnected by peripheral or edge seal of fused solder glass 4 and have an array of support spacers/pillars 5 therebetween.

Pump out tube 8 is sealed by solder glass 9 to an aperture or hole which passes from an interior surface of glass sheet 2 to the bottom of recess 11. A vacuum is attached to tube 8 (prior to the tube being sealed) so that the interior space 16 between sheets 2 and 3 can be evacuated to create a low pressure area. After evacuation, an end of tube 8 is melted to seal the vacuum in space 16. Optionally, getter 12 may be provided within recess 13 to counteract any rise in pressure due to any out-gassing from the glass.

FIG. 3 is a side cross sectional view of another conventional vacuum IG window unit. This unit differs from the FIG. 1–2 unit, in that its glass sheets are of different sizes so as to provide an L-shaped step around the unit's periphery, on which edge seal 4 is to be at least partially located. Moreover, this unit includes low-E coating 6 on the interior major surface of glass sheet 3.

Conventional vacuum IG units, with their fused solder glass peripheral seals 4, have been manufactured as follows. Solder glass for seal 4 is initially deposited around the periphery of the unit. The entire assembly, including sheets 2, 3 and the solder glass material, is then heated to a temperature of approximately 500 degrees C. at which the solder glass melts, wets the surfaces of the glass sheets, and flows by capillary action into the space between the sheets so as to form hermetic peripheral/edge seal 4. Such high temperatures, including ramping up and down periods, may be maintained for hours. After formation of seal 4, the assembly is cooled to room temperature.

As mentioned in column 2 of the aforesaid '395 patent, a conventional vacuum IG processing temperature is approximately "500° C. for 1 hour." Inventor Collins of the '395 patent stated in "Thermal Outgassing of Vacuum Glazing", by M. Lenzen, G. M. Turner and R. E. Collins, that "the edge seal process is currently quite slow: Typically the temperature of the sample is increased at 200° C. per hour, and held for one hour at a constant value ranging between 430° C. and 530° C. depending on the solder glass composition."

Unfortunately, these high temperatures used in forming edge seal 4 are undesirable, especially when it is desired to use a tempered glass sheet in the IG unit. Tempered glass loses temper strength upon exposure to high temperatures as shown and described in the aforesaid Ser. No. 09/348,281 application (incorporated herein by reference). For example, as shown and discussed in Ser. No. 09/348,281, only about 20% of original temper strength remains in a thermally tempered glass sheet after exposure to a temperature of about 482° C. for about one hour. Such a substantial loss of temper strength may result in certain window units not being able to pass safety codes set for environments where tempered glass is desirable. Moreover, such high temperatures may have an adverse effect upon certain low-E coatings that may be applied to one or both surfaces of the glass sheet(s).

In "Current Status of the Science and Technology of Vacuum Glazing", R. E. Collins and T. M. Simko (1998) state that "a low temperature process to make a hermetic edge seal would overcome this difficulty; despite significant efforts, however, such a process has yet to be shown to be viable."

"Fabrication of Evacuated Glazing at Low Temperature", by Griffiths, et al., discloses the provision of an indium wire around the edge of a vacuum IG unit for sealing purposes. Unfortunately, Griffiths, et al. do not address detempering problems. Furthermore, indium may not always be as durable as would be desired in certain environments and may allow for substantial oxidation to occur.

It is apparent from the above that there exists a need in the art for a vacuum IG unit, and corresponding method of making the same, where a durable hermetic seal may be formed at least partially between opposing glass sheets without having to heat the IG unit to the high processing temperatures referenced above, thereby allowing thermally tempered glass sheet(s) to retain a significant portion of their original temper strength after formation of the seal.

This invention will now be described with respect to certain embodiments thereof, accompanied by certain illustrations.

SUMMARY OF THE INVENTION

An object of this invention is to provide a peripheral or edge seal including an alkali silicate for use in a thermally insulating glass panel such as a vacuum IG window unit.

Another object of this invention is to provide a peripheral or edge seal for a vacuum IG window unit that may be formed at temperatures no greater than about 300° C.

Another object of this invention is to provide a low temperature peripheral or edge seal for a vacuum IG unit that enables tempered glass to be used in the unit without losing substantial temper strength during the unit's manufacture.

Another object of this invention is to provide a sodium silicate or potassium silicate inclusive seal or spacer in a vacuum IG unit.

Another object of this invention is to fulfill any and/or all of the above-listed objects and/or needs.

Generally speaking, this invention fulfills any or all of the above described objects or needs by providing a thermally insulating glass panel comprising:

first and second spaced apart glass substrates defining a low pressure space therebetween having a pressure less than atmospheric pressure;

a plurality of spacers disposed between said first and second glass substrates for spacing said substrates from one another in order to maintain said low pressure space therebetween; and a hermetic edge or peripheral seal including an alkali silicate.

This invention further fulfills any or all of the above described needs or objects by providing a method of making a thermally insulating panel, said method comprising the steps of:

providing first and second glass substrates;

providing a silica inclusive solution on at least one of the glass substrates proximate an area where a seal is to be formed;

heating the solution to a temperature of no greater than about 300° C. in order to form the seal which is to be at least partially provided between the glass substrates.

IN THE DRAWINGS

DETAILED DESCRIPTION OF CERTAIN EMBODIMENTS OF THIS INVENTION

Figure 2:
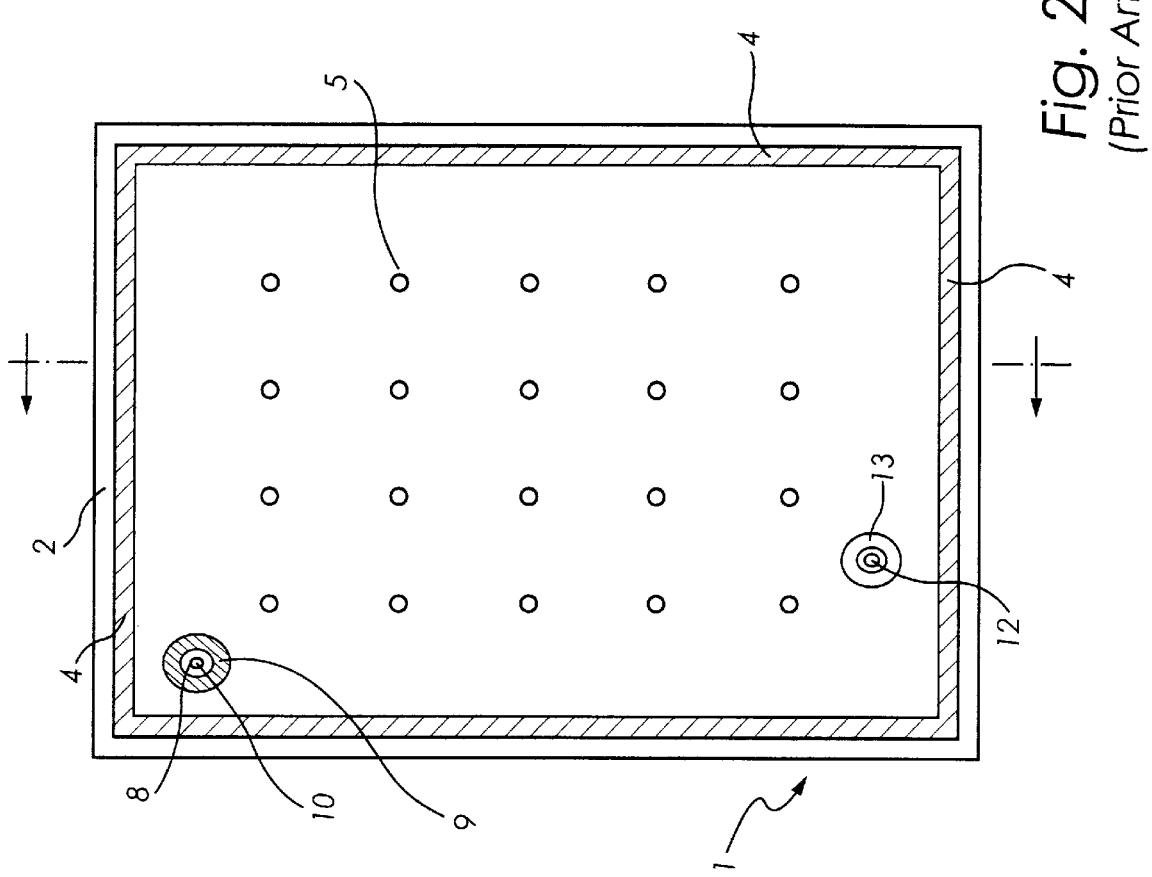
FIG. 2 is a top partial cross-sectional view of the FIG. 1 vacuum IG unit, absent the top glass substrate.

Referring now more particularly to the accompanying drawings in which like reference numerals indicate like parts throughout the several views.

Certain embodiments of this invention relate to an improved low temperature edge seal in a vacuum IG window unit. The low temperatures at which the edge seal may be formed enable thermally tempered glass to be used in vacuum IG window units in a manner such that the tempered glass does not lose substantial temper strength during the unit's manufacture (i.e. the glass does not lose more than about 30% of its original temper strength during the unit's manufacture). Certain embodiments of this invention also relate to a high strength edge seal in a vacuum IG window unit, wherein the edge seal is resistant to developing cracks, has good adhesion and strong bonding to the opposing glass substrates, flows well during manufacturing processes, and/or is economically efficient from a cost perspective.

Figure 1:
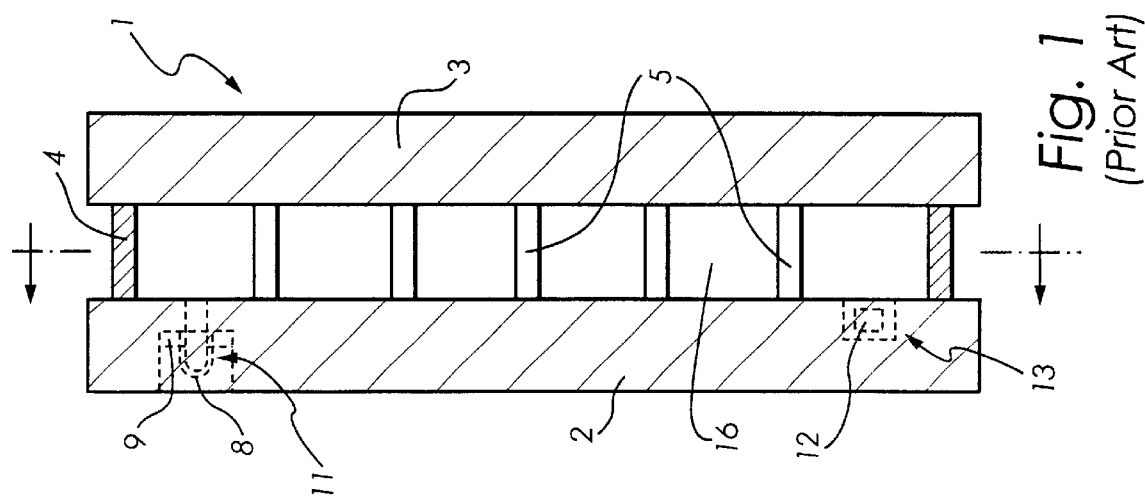
FIG. 1 is a prior art side partial cross-sectional view of a conventional vacuum IG window unit.
Figure 3:
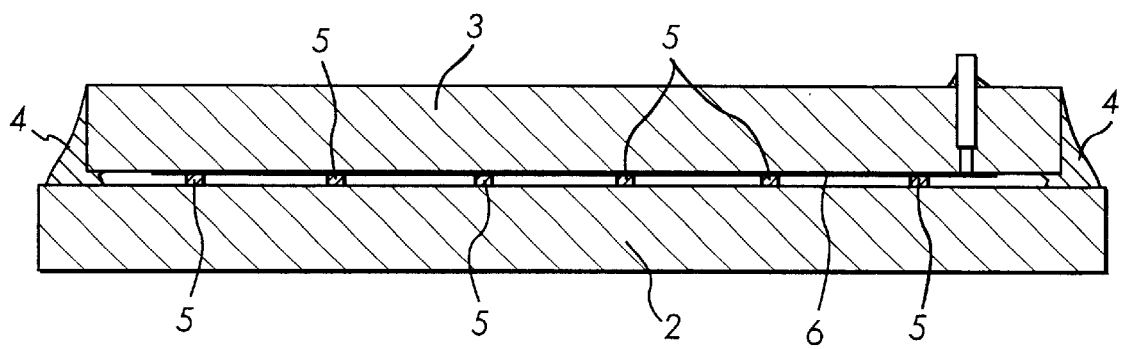
FIG. 3 is a side cross-sectional view of another conventional vacuum IG window unit.
Figure 4:
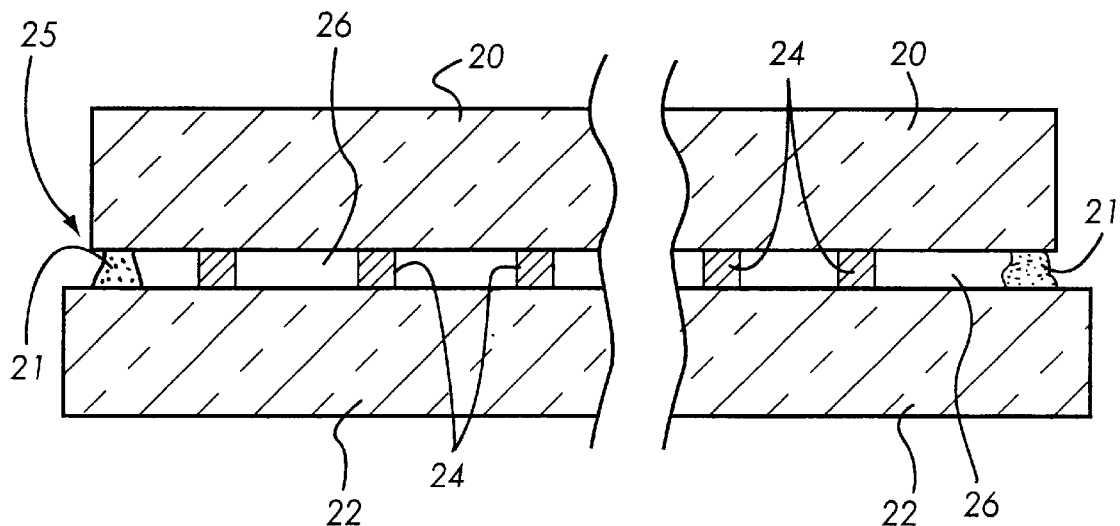
FIG. 4 is a side cross-sectional view of a vacuum IG window unit including a silicate inclusive peripheral or edge seal according to an embodiment of this invention.
Figure 5:
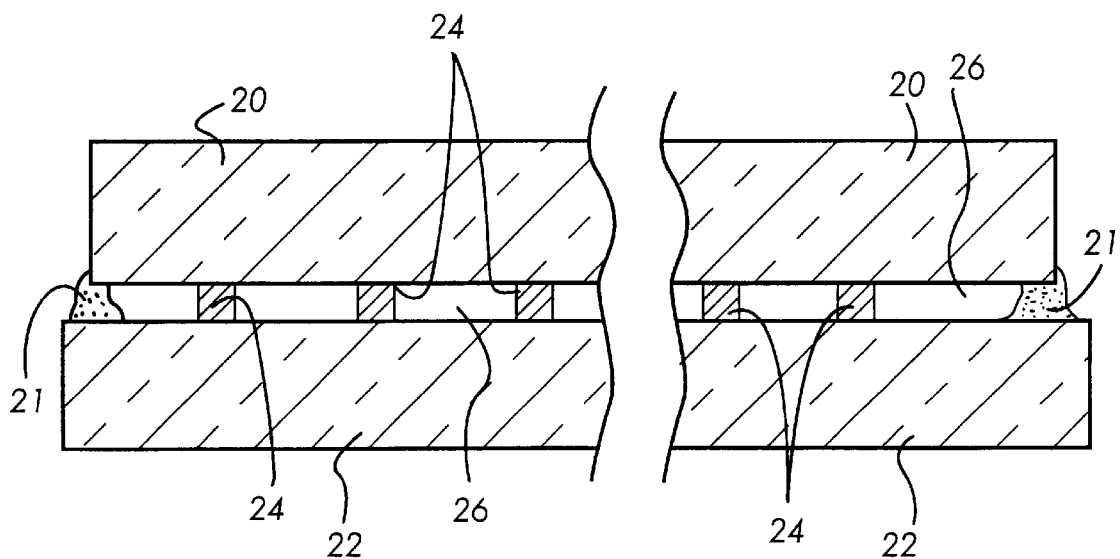
FIG. 5 is a side cross-sectional view of a vacuum IG window unit including a silicate inclusive peripheral or edge seal according to another embodiment of this invention.

Herein, edges of opposing vacuum IG substrates are hermetically sealed by at least one edge or peripheral seal (e.g., see reference numeral 4 in FIGS. 1–3 and reference numeral 21 in FIGS. 4–5). As can be seen in the drawings, "peripheral" and "edge" seals herein do not mean that the seal(s) are located at the absolute periphery or edge of the unit, but instead mean that the seal is at least partially located at or near (e.g., within about two inches of) an edge of at least one substrate of the unit.

FIGS. 4–5 illustrate exemplary vacuum IG window units according to different embodiments of this invention. Each vacuum IG window unit includes first and second opposing glass substrates 20 and 22 (tempered or non-tempered) which are spaced from one another by spacers or pillars 24 which maintain low pressure space 26 between the substrates. In certain preferred embodiments, substrates 20 and 22 are soda-lime-silica inclusive float glass. Hermetic peripheral or edge seal 21, provided between the substrates 20 and 22, seals off low pressure space 26 from surrounding atmospheric pressure. In the FIG. 4 embodiment, the peripheral/edge seal 21 is located entirely between the opposing substrates 20 and 22. However, in the FIG. 5 embodiment, the peripheral/edge seal 21 is located partially between substrates 20 and 22, and partially in L-shaped step area 25 at the periphery of the unit. L-shaped step 25 is provided due to substrate 22 being larger in size than substrate 20.

Vacuum IG units according to different embodiments of this invention may be used as residential or commercial windows. The evacuation of space 26 eliminates or reduces heat transport between glass substrates 20 and 22 due to gaseous conduction and convection. In addition, radiative heat transport between substrates 20 and 22 can be reduced to a low level by providing a low emittance (low-E) coating (s) 6 on a surface of one or both of sheets 20, 22. High levels of thermal insulation can thus be achieved. Low gaseous thermal conduction may be achieved when the pressure in space 26 is reduced to a level equal to or below about $0.5 \times 10^{-3}$ Torr, more preferably below about 0.1 mTorr, or $10^{-4}$ Torr, and most preferably below about $10^{-6}$ Torr of atmospheric pressure. The hermetic sealing system(s) 21, including one or more edge seals, substantially eliminates any ingress or outgress of gas or air to/from low pressure space 26.

Referring to FIGS. 4–5, the array of spacers or pillars 24 is provided between substrates 20 and 22 in order to maintain separation of the two approximately parallel glass sheets against atmospheric pressure. In certain embodiments, each spacer/pillar may have a height of from about 0.10 to 0.60 mm. Spacers or pillars 24 may take any suitable shape, including those of FIGS. 4–5. For example, spacers or pillars 24 may be spherical, cylindrical, square, rectangular, rod-like, bead-like, oval, trapezoidal, or the like. Moreover, in other embodiments, spacers/pillars 24 may be shaped as illustrated in any embodiment of U.S. Pat. No. 5,891,536. Spacers 24 may be made of solder glass, glass, ceramic, glass fiber(s), sapphire, any material disclosed in the '536 patent, or any other suitable material. In certain embodiments, all spacers 24 are of approximately the same size and/or material. However, in other embodiments, there may be different sizes of spacers 24 in the same vacuum IG unit. In certain embodiments, the density of spacers (i.e., the number of spacers per unit area) may be greater in certain areas than in other areas, or alternatively, the density of the spacers may be approximately uniform throughout the entire unit.

In certain embodiments of this invention, peripheral or edge seal 21 (or 4) may be made of or include an alkali silicate (e.g. sodium silicate, potassium silicate, etc.) material. The material for seal 21 is initially deposited or otherwise provided on one or both of substrates 20, 22 (e.g. on step 25) in aqueous solution form such as quasi-liquid or syrup form (i.e., soluble or liquid glass) at a location proximate to where the seal is to be formed. Thereafter, the two substrates 20, 22 along with the material for seal 21 are together heated to a curing temperature no greater than about 300° C. (more preferably no greater than about 225° C., and most preferably no greater than about 150° C.) for a period of time of from about 0.25 to 5.0 hours so as to allow the water of the solution to evaporate thereby causing the seal material to cure or crystallize into solid hermetic peripheral/edge seal 21. When the substrates with silicate seal material therebetween are heated, water evaporation from the seal material occurs at a substantial rate at temperatures greater than or equal to about 100 degrees C. Thus, all water need not leave the seal material during the curing process, which means that the seal material may crystallize (e.g. at 120–160 degrees C.) or may remain at least partially liquid (e.g. at sealing temperatures from room to 60 degrees C.). When seal 21 is at least partially liquid, an additional edge seal(s) (i.e. one or more additional seals) may be provided in order to protect the silicate inclusive seal from weather effects.

In certain preferred embodiments, seal 21's curing temperature is from about 40° to 150° C., more preferably from about 50° to 120° C. For example, in certain embodiments, the edge seal solution may be cured at about 60° C. for about three hours, or alternatively may be cured at about 100° C. for about one hour. The cure time is a function of the cure temperature, and vice versa. These low temperatures enable thermally tempered glass substrates 20, 22 to be used in a manner such that they do not lose substantial temper strength during formation of edge seal 21.

Thus, the alkali silicate material of an edge seal of this invention differs from conventional solder glass edge seal in that the silicate (i) has a much lower curing temperature than conventional solder glass, i.e. high lead borate or borosilicate glass, (ii) is put down in syrup or quasi liquid form on one of the glass substrates (instead of powder form in the case of conventional solder glass combined with a liquid binder resulting in paste), (iii) and the silicate does not have to be heated to an energy sufficient to melt glass as with solder glass.

In certain preferred embodiments, peripheral/edge seal 21 may be of or include $Na_2O$-$MSiO_2$ (i.e. a form of sodium silicate) or alternatively may be of or include $K_2O$-$MSiO_2$ (i.e. a form of potassium silicate), where "M" represents a modulus of glass and may be from about 1.0 to 5.0 (more preferably from about 2.5 to 3.5, and most preferably about 3.0). In other words, with reference to $Na_2O$-$MSiO_2$ for example, the ratio by weight of $Na_2O$:$SiO_2$ (sodium oxide to silica ratio) may be from about 1:1 to about 1:5, more preferably from about 1:2.5 to 1:3.5, and most preferably about 1:3.

While the term "sodium silicate" is used herein, this term is not limited to only $Na_2O$-$MSiO_2$, but includes, for example without limitation, sodium orthosilicate, sodium tetrasilicate, sodium metasilicate, sodium silicate, $Na_4O_4$-$MSiO_2$(or Si), $Na_2O$-$MSiO_3$, $Na_2$-$MSi_4O_9$, and other comparable silicates whether in dry or solution form. This is also true with regard to other silicate terms used herein, such as potassium silicate and alkali silicate.

As discussed above, the material for seal 21 may be initially deposited or otherwise provided on one or both of substrates 20, 22 proximate an edge or periphery thereof in aqueous solution form (e.g. $Na_2O$-$MSiO_2$-$xH_2O$). The initial viscosity of the solution when deposited is a function of the concentration C of the alkali silicate in water and of the value of M. For example, for $Na_2O$-$MSiO_2$-$xH_2O$, (i) when M=3 and C=42%, the solution's viscosity is about 0.53 Pa·s (pascal per second), (ii) when M=2.5 and C=40%, the solution's viscosity is about 0.2 Pa·s, and (iii) when M=3 and C=42%, the solution's viscosity is about 0.2 Pa·s.

In certain embodiments of this invention, the solution's initial viscosity when originally deposited on a glass substrate in aqueous form is from about 0.20 to 8.0 Pa·s, more preferably from about 1.0 to 6.0 Pa·s. The concentration "C" of alkali silicate, in water or other liquid carrier in the initially deposited aqueous solution, is preferably from about 30 to 50%, more preferably from about 35 to 45%, and most preferably from about 39 to 43%. Again, after the solution is deposited (e.g. in the L-shaped step area 25 of FIGS. 4–5 or otherwise between the opposing substrates), the substrates along with the solution are heated to the curing temperature (see above) so that the solution cures as the water evaporates thereby leaving solid edge seal 21.

In other embodiments of this invention, the alkali silicate inclusive edge seal 21 may further include admixtures such as CaO (e.g. from about 0 to 1.0%, more preferably from about 0.4 to 0.6% by weight of the seal material), and/or $Al_2O_3$+$Fe_2O_3$ (e.g. one or both of these being from about 0 to 2.5%, more preferably from about 1.0 to 1.35% by weight of the seal material). Moreover, in addition to silicate, known binders (although not preferred in certain embodiments) may also be included within edge seal 21 material in order to increase viscosity. In certain embodiments of this invention, the aqueous silicate solution (e.g. potassium silicate) for seal 21 may be commercially obtained from PQ Corporation, P.O. Box 840, Valley Forge, Pa.

In view of the above, an edge or peripheral seal 21 inclusive of at least one alkali or other silicate is provided. Seal 21 maintains a hermetic seal, is not prone to developing cracks or chips, is not prone to delaminating, has good adhesion and sufficiently strong bonding strength, flows well during curing between the opposing substrates, and is capable of rapid curing (i.e. cure time less than 90 minutes if desired). Moreover, aqueous solutions of alkali silicate are relatively inexpensive (e.g. cheaper than indium), and are capable of heating up and cooling down during the seal formation cycle in a manner such that the seal's unity and construction are not sacrificed.

In certain preferred embodiments of this invention, substrates 20 and 22 are thermally tempered. The low curing temperatures used for curing alkali silicate inclusive seal 21 allows one or both of the thermally tempered sheets 20, 22 to retain at least about 70% (more preferably at least about 80%, and most preferably at least about 90%) of their original temper strength at a point in time after seal 21 has been cured and formed.

While the embodiments of FIGS. 4–5 illustrate the vacuum IG window unit as including only a single hermetic edge/peripheral seal 21, this invention is not so limited. For example, in certain other embodiments, one, two or more outer protective edge seal(s) may be provided in addition to edge seal 21 around or proximate seal 21's outer periphery in order to protect hermetic edge seal 21 from humidity, water, snow, rain, dirt, mechanical impacts, and the like. Such a protective seal (or secondary seal) may be of or include rubber, polymer resin, alkali silicate, Lock-Tight glue, or any other suitable material.

In alternative embodiments of this invention, spacers/pillars 24 of a vacuum IG window unit may also be made of or include any of the alkali silicate materials referenced above in any embodiment herein. This enables the spacers to be initially deposited in an aqueous solution, and thereafter cured into solid spacers, which may be desirable in certain applications. Substantially transparent spacers 24 may be provided in such a manner of suitable hardness (e.g. 4.5 to 5.0) to withstand pressure due to atmospheric pressure. In certain embodiments, surface(s) of a silicate spacer 24 may tend to rehydrate when placed into a VIG oven used in forming an edge seal thereby causing the spacers 24 to bond to one or both of the glass substrates in order to reduce shear movement of the unit. In other embodiments, the silicate spacers may be formed at the same time as the silicate edge seal so that the water from both evaporates simultaneously.

Once given the above disclosure, many other features, modifications, and improvements will become apparent to the skilled artisan. For example, seal 21 in FIGS. 4–5 is shown as an edge seal; however in other embodiments of this invention seal 21 need not be provided proximate an edge of the unit, but may be provided at any other suitable location. Such other features, modifications, and improvements are, therefore, considered to be a part of this invention, the scope of which is to be determined by the following claims.

We claim:

1. A thermally insulating glass panel comprising:

first and second spaced apart glass substrates defining a low pressure space therebetween having a pressure less than atmospheric pressure;

an array of spacers disposed between said first and second glass substrates for spacing said substrates from one another in order to maintain said low pressure space therebetween; and a hermetic edge or peripheral seal including an alkali silicate, wherein said edge or peripheral seal surrounds said low pressure space between the substrates, and wherein said seal including the alkali silicate bonds the first and second substrates to one another and has a thickness approximately equal to that of the space defined between the first and second substrates.

2. The glass panel of claim 1, wherein said alkali silicate includes at least one of sodium silicate and potassium silicate.

3. The glass panel of claim 1, wherein said edge seal is initially deposited in an aqueous solution form on at least one of said substrates and thereafter cured at a maximum curing temperature of no greater than about 300° C.

4. The glass panel of claim 3, wherein at least one of said glass substrates is tempered, and said edge seal is cured in a manner such that after the edge seal is cured and formed said one tempered glass substrate retains at least about 70% of its original temper strength.

5. The glass panel of claim 1, wherein said edge or peripheral seal further includes at least one of CaO, $Al_2O_3$ and $Fe_2O_3$.

6. The glass panel of claim 1, wherein said alkali silicate includes at least one of: sodium silicate, sodium orthosilicate, sodium tetrasilicate, sodium metasilicate, potassium silicate, potassium orthosilicate, potassium tetrasilicate, and potassium metasilicate.

7. The glass panel of claim 1, wherein material for said edge or peripheral seal is initially deposited on at least one of said substrates in an aqueous solution form having a viscosity of from about 0.20 to 8.0 Pa·s, prior to being cured and formed into said seal.

* * * * *